United States Patent [19]

Speidel

[11] Patent Number: 4,539,690
[45] Date of Patent: Sep. 3, 1985

[54] AUTOMATIC AND ADAPTIVE DIGITAL NONLINEAR DECISION FEEDBACK EQUALIZER

[75] Inventor: Joachim Speidel, Nuremberg, Fed. Rep. of Germany

[73] Assignee: Tekade Felten & Guillaume Fernmeldeanlagen GmbH, Nuremberg, Fed. Rep. of Germany

[21] Appl. No.: 368,395

[22] Filed: Apr. 14, 1982

[30] Foreign Application Priority Data

Apr. 24, 1981 [DE] Fed. Rep. of Germany ....... 3116266

[51] Int. Cl.³ ............................................... H04B 3/14
[52] U.S. Cl. ......................................... 375/14; 333/18; 364/724
[58] Field of Search ......................... 375/11, 12, 13, 14, 375/15, 16; 333/18; 364/724, 572

[56] References Cited

U.S. PATENT DOCUMENTS

| 3,868,603 | 2/1975 | Guidoux | 375/15 |
| 4,038,536 | 7/1977 | Feintuch | 367/724 |
| 4,334,313 | 6/1982 | Gitlin et al. | 375/15 |
| 4,349,889 | 9/1982 | Van den Elzen et al. | 375/16 |
| 4,386,430 | 5/1983 | Treiber | 375/14 |

*Primary Examiner*—Robert L. Griffin
*Assistant Examiner*—Stephen Chin
*Attorney, Agent, or Firm*—Horst M. Kasper

[57] ABSTRACT

A method and apparatus for equalizing a scanned noisy digital signal with an automatic and adaptive decision feedback equalizer comprising a nonrecursive part and a recursive part. A switch is disposed in the feedback loop of the equalizer between a decision device and the recursive part of the equalizer for allowing the determination of a step size factor. For this purpose the switch is in such a position that a reference signal can be fed into the feedback loop and at the same time the gradient coefficients are fed to a device for setting the filter coefficients. The gradient coefficients are determined at that point in time where the switch was set to the other switch setting. The number of the required interation intervals to approaching the minimum of the equalization error can be decreased by employing the method of the present invention. In addition, the filter configuration can be employed in a multiplex operation.

27 Claims, 4 Drawing Figures

AUTOMATIC AND ADAPTIVE DIGITAL NONLINEAR DECISION FEEDBACK EQUALIZER

BACKGROUND OF THE INVENTION

1. Field of the Invention

The present invention relates to an apparatus and method for equalizing an incoming noisy digital signal for an automatic and adaptive decision feedback equalizer where a correction procedure is derived from a reference signal and a filter output signal and where the correction procedure is minimized by iteration according to the gradient procedure and is employed for setting of filter coefficients.

2. Brief Description of the Background of the Invention Including Prior Art

A superposition disturbance occurs between successive symbols in the transmission of electrical signals, which are employed for the transfer of information such as for example data. Clocked systems are employed for equalization of the symbols, where the equalization is performed in a time region. Most of the conventional, automatic and adaptive equalizers have decision feedback or are transversal filters, where variations of the equalizer transfer function are considered and evaluated. These changes in the transfer function are generated in order to obtain the best possible output signals.

In an automatic and adaptive equalizer with decision feedback the incoming noisy digital signal is fed to the filter device. The filter contains a recursive and a nonrecursive part. The filter coefficients are set by iteration according to the gradient procedure with a constant step factor. For example, for this purpose the filter output signal and a reference signal are fed to a summing device. A difference signal, that is the equalization error, is formed between the reference signal and the filter output signal and the least square error is determined. An automatic equalization is provided if ahead of the data transmission proper an arranged signal (preamble) is transmitted. For this purpose a pseudo random text or individual pulses can be employed. The reference signal can be generated by guessing (that is decision) of the equalizer output signal (estimated reference signal) or can be generated on the receiving end (ideal reference signal). In the case of adaptive setting of the equalizer no preamble is transmitted, but the reference signal is estimated.

The selection of a constant step factor in the iterative setting of the filter coefficients according to the gradient procedure is a disadvantage in such a circuit. Only inaccurate data are available in advance for the constant set step factor, since the step factor in general depends to a high degree on the characteristics of the channel. If the step factor is selected sufficiently small, then the convergence of the filter system in fact is assured, but the minimum of the equalization error is only approached very slowly. If the constant step factor is selected as too big, then the equalization setting diverges. The equalization error then deviates strongly from the minimum and the achieved equalization is insufficient.

Miloradovic et al. in U.S. Pat. No. 4,037,160 teach adjusting and readjusting an automatic connector for a data signal transmission system. The corrector serves to restore pulse-amplitude-modulated signals which have suffered linear distortions in a transmission channel. A transversal filter of the corrector receives during a first adjustment phase a reference signal sequence transmitted over the transmission channel and an identical reference signal produced at the receiving end to produce error signals which serve to adjust the transversal filter coefficients stored in the corrector. A transversal filter is a special case of a nonrecursive filter. The filter coefficients are subdivided into at least two groups and during the first phase one group of filter coefficients is calculated with a more attenuated error signal than the filter coefficients of the other group. The output signal of the transversal filter is correlated with the data signal arriving at the input of the transversal filter.

SUMMARY OF THE INVENTION

1. Purposes of the Invention

It is an object of the present invention to provide a method where the iterative approximation to the minimum of the equalization error can be performed within a short time.

It is another purpose of the present invention to provide for a switch which allows to employ the digital filter circuit alternatively for determination of the equalization and for the determination of coefficients relevant for obtaining the step factor.

It is another object of the present invention to provide a system which combines the advantages of a recursive and nonrecursive parts containing filter with decision feedback.

These and other features and advantages of the present invention will become evident from the desciption which follows.

2. Brief Description of the Invention

The present invention provides an automatic and adaptive digital nonlinear decision feedback equalizer which comprises a digital filter having a recursive part and a nonrecursive part, a decision device connected to the output of the digital filter, a switch having a first input connected to the output of the decision device and having its output connected to an input of the recursive side of the digital filter, and a reference signal source connected to a second alternate input of the switch for inducing in its switched on position in the digital filter a signal ($w_n$) for the determination of a step factor.

The digital filter can comprise setting devices ($Ma_j, Mb_k$) for setting the filter coefficients and/or the filter output signals. Means can be provided for deriving variable step factors depending on the digital filter output signals.

Means for determining gradient coefficients ($g_j, \bar{g}_k$) according to the output of the digital filter can be provided, means for squaring the gradient coefficients can be connected to the means for determining the gradient coefficients, an adding device can sum the squared gradient coefficients. A second means for squaring the digital filter output signals can be connected to the digital filter output, means for summing the squared filter output signals can be connected to the second means for squaring, an inverting means can be connected to the adding device for inverting the sum of a squared filter output signal ($w_n$), and multiplier means can be connected to the inverting means and to the means for summing.

A second switch ($S_4$) is preferably interposed between the adding device and the inverting means and a storage for step factors can be connected to the multiplier means.

Preferably, a memory connectable to the input of the digital filter is provided for storing an input signal as desired. An adding member can be connected to the output of the digital filter and to a reference signal source for providing an equalizing error signal.

Preferably, a multiplier is connected to the adding member and to the filter for multiplying the equalizing error signal with a delayed input signal, a second adding member is connected to the output of the multiplier for adding the output of the multiplier over certain time intervals, a third switch ($S_{3v}$) is connected to the output of the second adding member, and a storage is connected to the third switch for storing the gradient components. There can also be provided a storage for step factors, a second multiplier connected to the third switch and to the storage for step factors, a third adding member connected to the output of the second multiplier and to the digital filter, and a delay device connected to the output of the third adding member and its output being connected to the digital filter. A switchable connection can be provided between the storage and the digital filter.

There can be further provided a third multiplier connected to the adding member and to the filter for multiplying the equalizing error signal with a delayed input signal of the recursive part of the digital filter, a fourth adding member connected to the output of the third multiplier for adding the output of the third multiplier over certain time intervals, a fourth switch ($S_{3R}$) connected to the output of the fourth adding member, a second storage connected to the fourth switch for storing the gradient components, a storage for step factors, a fifth multiplier connected to the fourth switch and to the storage for step factors, a fifth adding member connected to the output of the fifth multiplier and to the digital filter, and a second delay device connected to the output of the fifth adding member and having its output connected to the digital filter. There can be further provided means for determining gradient coefficients ($g_j, \tilde{g}_k$) according to the gradient procedure connected to the output of the digital filter and to the input of the storage for providing gradient coefficients to the storage. Two series of delay members can be provided with each series in a series connection. A plurality of setting devices can be connected to respective outputs of the delay members or to the signal input and a summing device ($S_{y_n}$) can be connected to the setting devices. Multiplier can be connected to a storage for gradient coefficients.

A third adding member can provide filter coefficients ($b_k$), a fifth adding member can provide filter coefficients ($a_j$), a delay device can be connected to a third adding member, a second delay device can be connected to the fifth adding member and the setting devices can be further connected to the delay device or to the second delay device.

There is also provided a method for equalizing an incoming noisy signal, which employs an automatic and adaptive decision feedback equalizer. The output signal from an in part nonrecursive and in part recursive digital filter is fed back, the output signal of the digital filter is fed to a decision device, a reference signal is provided by a reference signal source, a first input terminal of a switch is connected to the output of the decision device, where the output terminal of the switch is connected to the filter, for allowing the filter to generate an equalizer output, a second input terminal of the switch is connected to the reference signal source for allowing the filter to generate a filter output signal, and the filter output signal is employed to determine a step factor for the filter. The step factor can be derived from the digital filter by evaluating the mean squared error between a reference signal and a filter output signal. The criterion can be minimized according to the gradient procedure.

The digital filter can comprise a recursive part and a nonrecursive part with respective filter coefficients ($a_j, b_k$) and a switch can be provided between the decision device and a device ($Ma_j, Mb_k$) for setting the filter coefficients ($a_j, b_k$). The gradient coefficients ($g_j, \tilde{g}_k$) can be determined according to the gradient procedure at the starting point of an iteration interval, the gradient coefficients ($g_j, \tilde{g}_k$) can be stored in a memory, the switch can be switched into a second position, the stored gradient coefficients ($g_j, \tilde{g}_k$) can be fed to the device ($Ma_j, Mb_k$) for providing the filter output signal ($w_n$), the variable step factor can be produced from the filter output signal ($w_n$) and from the gradient coefficients ($g_j, \tilde{g}_k$), the variable step factor can be stored in a memory, and the optimal setting of each filter coefficient ($a_j, b_k$) can be determined during an iteration interval from the variable step factor and from the stored gradient coefficients ($g_j, \tilde{g}_k$).

In each case the gradient coefficients can be squared, the squared gradient coefficients can be added, the filter output signal ($w_n$) can be squared, the squared output signals can be added, the sum of the squared output signals can be inverted, the inverse of the sum of the squared filter output signals can be multiplied with the sum of the squared gradient coefficients for obtaining the variable step factor. The filter output signal can be summed over a specified number of cycles and the resulting sum can be read or extracted via a switch.

Alternatively, the gradient coefficients ($g_j, \tilde{g}_k$) can be summed as absolute values, the filter output signals ($w_n$) can be summed as absolute values, the sum of the filter output signals can be inverted and the inverse of the sum of the filter output signals can be multiplied with the sum of gradient coefficients for obtaining a step factor.

In one aspect of the invention an incoming noisy digital signal for an automatic and adaptive decision feedback equalizer is equalized, where a correction procedure is derived from a reference signal and from the filter output signal and where the correction procedure is minimized by way of iteration according to the gradient procedure. The equalizer comprises a recursive and a nonrecursive part, a switch is disposed in the feedback loop between a decision device (D) and the recursive part, where in a first position (1) of the switch (S1) an output signal of the decision device ($\hat{y}_n$) and where in a second position (2) of the switch (S1) a reference signal ($r_n$) is fed to the feedback branch of the filter and where the reference signal ($r_n$) is employed together with the filter output signal ($w_n$) for the determination of the step factor ($\alpha$).

The switch (S1) can be provided in the feedback loop of a filter (Fi) comprising a recursive part and a nonrecursive part with respective filter coefficients ($a_j, b_k$) between the decision device (D) and a device ($Ma_j, Ma_k$) for setting the filter coefficients ($a_j, b_k$), where at the start of the iteration interval (i) the gradient coefficients ($g_j, \tilde{g}_k$) are calculated according to the gradient procedure and stored for the time interval during which the switch (S1) is positioned in the position (1). Thereafter the switch (S1) is brought into the second position (2) and the stored gradient coefficients ($g_j, \tilde{g}_k$) are fed to the device ($Ma_j, Ma_k$) for determining the filter output signal ($w_n$). The variable step factor ($\alpha$) is derived from the filter output singal ($w_n$) and from the stored gradient coefficients ($g_j, \bar{g}_k$) and the optimal setting for each filter coefficient ($a_j, b_k$) is determined during an iteration interval (i) with the variable step factor ($\alpha$) and the stored gradient coefficients ($g_j, \bar{g}_k$).

In each case the stored gradient coefficients ($g_j, \bar{g}_k$) can be squared, a sum can be formed from the squared gradient coefficients, the filter output signal ($w_n$) can be squared, summed and the resulting sum can be inverted, and the inverse of ($\alpha_{ne}$) of the squared and summed filter signals ($w_n$) can be multiplied with the sum ($\alpha_z$) of the squared gradient coefficients for determination of the variable step factor ($\alpha$). Preferably, the filter output signal ($w_n$) is summed up over a number of clock cycle periods and the sum can be read via a switch ($S_4$).

If desired, the stored gradient coefficients ($g_j, \bar{g}_k$) can be added according to their absolute value, the filter output signal can be added according to its absolute value, and the resulting sum can be inverted and the inverse of the sum of the absolute values of the filter output signals ($w_n$) can be multiplied with the sum of the absolute values of the gradient coefficients for obtaining the step factor ($\alpha$).

Preferably, the mean square error is derived between a reference signal and a filter output signal as a basis for the correction procedure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are illustrated several of the various possible embodiments of the present invention.

DESCRIPTION OF INVENTION AND PREFERRED EMBODIMENTS

In accordance with the present invention the equalizer comprises a nonrecursive and a recursive part, a switch is disposed in the feedback loop between a decision device and the recursive part of the filter, where in one setting of the switch an equalizer output signal and in the second setting a filter output signal is generated with the filter and where in the second switch position a reference signal is fed into the feedback branch and is employed together with the filter output signal for determination of a step factor.

According to a preferred embodiment of the present invention the switch is provided in the feedback loop of a filter with a nonrecursive part and with a recursive part with corresponding filter coefficients disposed between the decision device and a device for setting the filter coefficients. The gradient coefficients are calculated according to the gradient procedure and are stored at the beginning of the iteration interval for a time, during which the switch is in the one position. Then the switch is turned to the other position and the stored gradient coefficients are fed to the device for setting the filter coefficients. A variable step factor is derived from the filter output signal and from the stored gradient coefficients and is stored. The optimal setting during an iteration interval is determined for each filter coefficient from the variable step factor and the stored gradient coefficients. Thus the path of signals through the filter is multiplexed.

The present apparatus and method entail the advantage that the number of iteration intervals required for approximation to the minimum of the equalization error can be decreased. The filter configuration can be employed in multiplex operation for determining the variable step factor. In order to minimize the equalization error beside the method of minimizing the mean square equalization error also the minimization of the mean value of the absolute values of the equalization error or other criteria such as formation of a control quantity by employing a pure sign correlation can be employed. The filter configuration can be realized for example by employing a fast digital multiplier together with storage elements and adding circuits.

Figure 1:
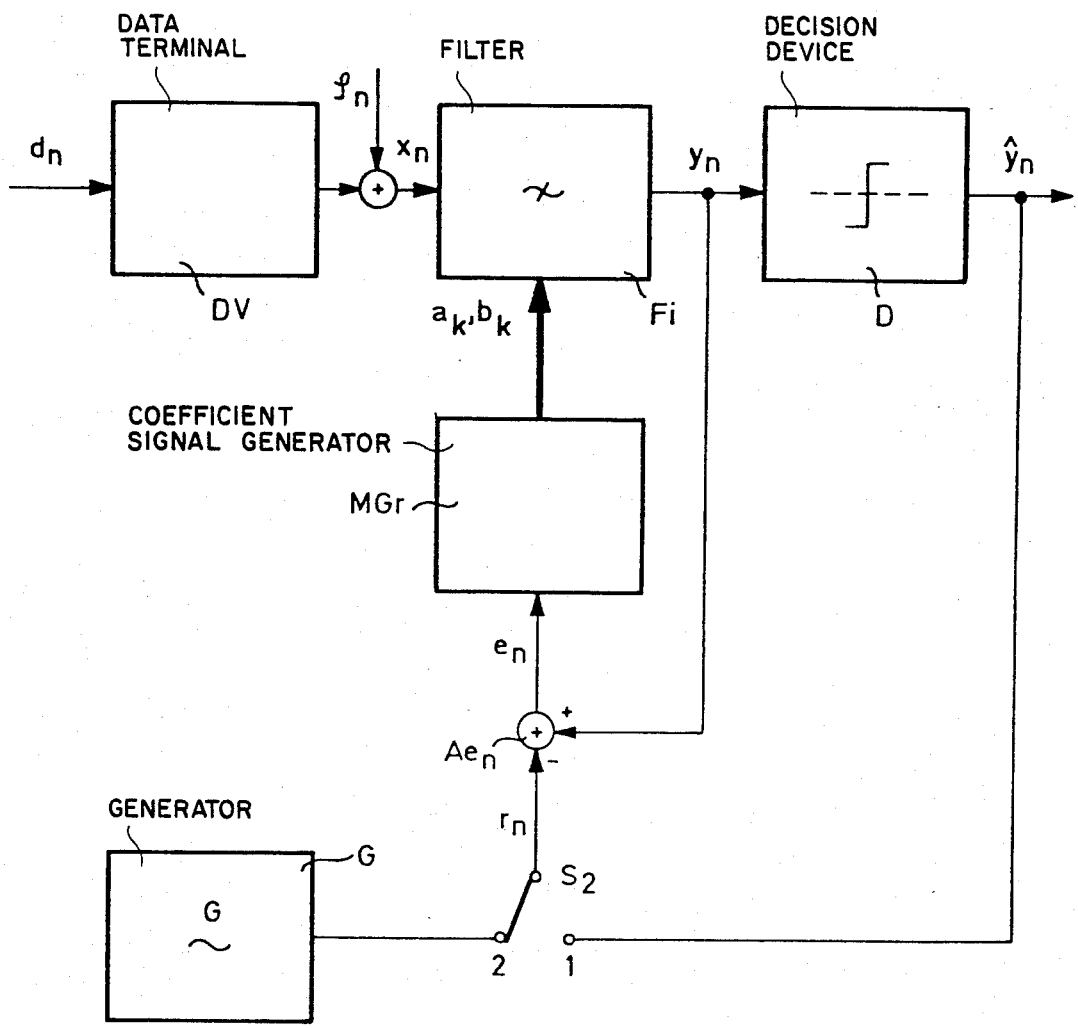
FIG. 1 is a diagram of circuit blocks of a transmission system comprising an automatic and adaptive decision feedback equalizer.

Referring now to FIG. 1 there is shown a known possibility for constructing an automatic and adaptive decision feedback equalizer. A noise signal $\rho_n$ is additively superimposed to a data signal $d_n$ transmitted via a connection line and with a data transmission system. The data transmission system can be described by a time discrete model which is in a block circuit diagram depicted by a device DV and which comprises the connection line and the data terminal such as for example modulators, demodulators and filters. A scanned noisy data signal $x_n$ is fed to an adaptive digital filter Fi. A filter output signal $y_n$ results at the output of the filter Fi and the output signal is fed to a decision device D and to an adding member $Ae_n$. The filter in general comprises a nonrecursive and a recursive part and the filter coeffients of the nonrecursive and of the recursive part are determined by iteration according to the gradient procedure with a constant step factor or by another method.

For this purpose setting signals for the change of the filter coefficients $a_j$, $b_k$ by iteration are determined in a device designated as MGr. In this context a value designated as $e_n$ is called equalization error, which value is formed from the difference of the equalizer output signal $y_n$ and a reference signal $r_n$.

A special signal (preamble) known to the receiver is transmitted in advance of the data proper for the automatic setting of the equalizer. In this case the reference signal $r_n$ can be generated by a generator G on the receiver side and a switch is set to a position 2. The output signal $\hat{y}_n$ of the decision device D can be employed also as the reference signal $r_n$. Then the switch $S_2$ is placed in the position 1.

No preamble is transmitted in the case of an adaptive setting of the equalizer. The reference signal $r_n$ is formed by $\hat{y}_n$ and the switch $S_2$ is situated in the position 1. The following equations hold for minimizing the mean squared error I:

$$e_n = y_n - r_n \qquad (1)$$

$$y_n = \sum_{k=0}^{N} b_k x_{n-k} - \sum_{k=1}^{M} a_k y_{n-k} \quad (2)$$

$$I = E\{e_n^2\} \quad (3)$$

A coefficient vector K, which can be written as $$K = (a_1 a_2 \ldots a_M | b_0 b_1 \ldots b_N) \quad (4)$$

can be employed for the iterative determination of the filter coefficients according to the gradient method and as set forth the filter coefficients $a_j$ and $b_k$ to be set are the components of the coefficient vector K. The coefficient vector K can be determined by the following equation $$K(i) = K(i-1) - \alpha(i-1) \cdot \tfrac{1}{2} \cdot (\nabla I)_{i-1} \quad (5)$$

The iteration index is designated as i, the gradient vector $(g_j, \tilde{g}_k)$ is designated as $\nabla I$ and the constant or variable step factor is designated as $\alpha(i-1)$.

The gradient components are obtained from equations (2) and (3) as $$\frac{\partial I}{\partial a_j} = 2g_j = -2E\{e_n y_{n-j}\} \; j = 1, 2, \ldots, M \quad (6)$$

$$\frac{\partial I}{\partial b_k} = 2\tilde{g}_k = 2E\{e_n x_{n-k}\} \; k = 0, 1, \ldots, N \quad (7)$$

where it is assumed that $\hat{y}_n$ is approximately independent of $a_j$ and $b_k$.

Figure 2:
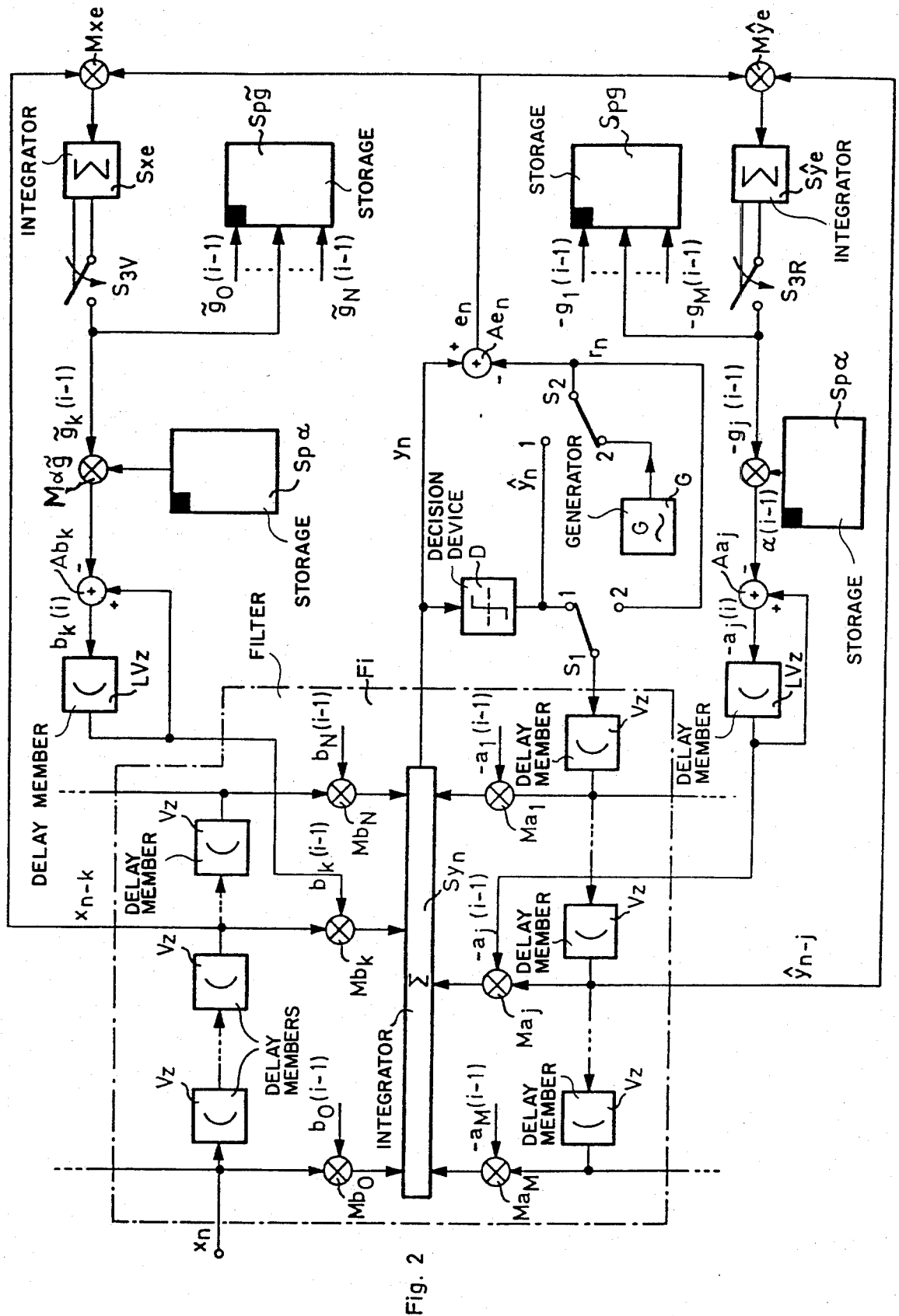
FIG. 2 is a circuit of an embodiment for determining the filter coefficients according to the gradient procedure in connection with a variable step factor.

The method according to the present invention for decreasing the number of the iteration intervals i for determining the minimum of the mean square equalization error I comprises that the coefficient vector K(i) is determined by way of a variable step size factor $\alpha(i-1)$. A preferred embodiment of the structure of an automatic and adaptive decision feedback equalizer is shown in FIG. 2, where the iterative setting of the filter coefficients $a_j$ and $b_k$ is provided according to the gradient procedure with a variable step size factor $\alpha$. The circuit state shown in FIG. 2 is in the momentary state of the iteration index (i-1). The filter Fi comprises a recursive an a nonrecursive part with in each case devices $Ma_j$ and $Mb_k$ for setting of the filter coefficients $a_j$ and $b_k$. The scanned, noisy data signal $x_n$ is fed to a number of delay members Vz connected in sries. The delay members Vz in each case are connected to the devices Mb for the setting of the filter coefficients b. The indexing labels set in brackets refer to the iteration interval such as for example (i-1), while the lower case indexing indicates which of the N+1 or respectively M filter coefficients b or a is determined. FIG. 2 shows the state of the circuit for determining of the parameters $a_j, b_k, g_j, \tilde{g}_k$.

Figure 3:
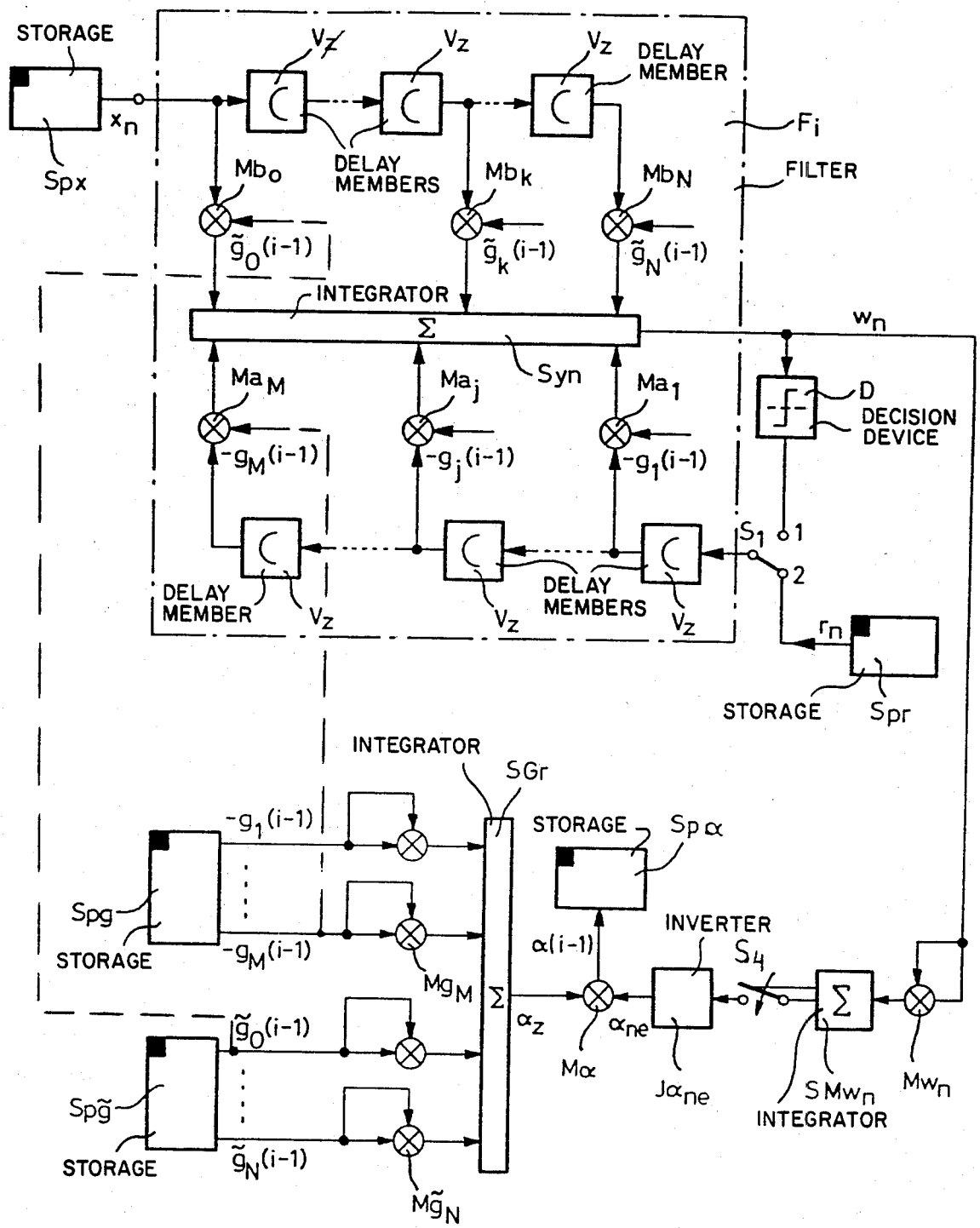
FIG. 3 is an embodiment illustrating a possible construction of a circuit for determination of the variable step factor.

In particular FIG. 2 shows the determination of the k-th filter coefficient $b_k$ or respectively of the j-th filter coefficient $a_j$ during the iteration interval corresponding to index (i-1). The gradient coefficients $\tilde{g}_k$ and $g_j$ are determined for the iteration interval (i-1) from a number L of time discrete scanning values. For this purpose the equalization error $e_n$ is multiplied with the delayed scanning value $x_{n-k}$ in a multiplier Mxe and the resulting products are summed. After the summing a switch $S_3\nu$ is closed and the gradient coefficient $\tilde{g}_k(i-1)$ is fed both to the storage Sp$\tilde{g}$ as well as to the multiplier Ma$\tilde{g}$. Now the determination of the variable step factor $\alpha(i-1)$ follows, which is illustrated in FIG. 3 and which will be explained later. The determined step factor $\alpha(i-1)$ is in the storage Sp$\alpha$. The gradient coefficient $\tilde{g}_k(i-1)$ is connected with the stored, variable step size factor $\alpha$ in the multiplier Ma$\tilde{g}$ and the product is fed to an adding member $Ab_k$ (FIG. 2). The difference is formed from the filter coefficient $b_k(i-1)$ and a correction value, the multiplier output signal, and is fed to the device $Mb_k$ for setting of the filter coefficient $b_k$ after passing through a delay device LVz. The equalization error $e_n$ is connected with the decided equalizer output signal $\hat{y}_{n-j}$ in the similarly constructed recursive part of the filter circuit Fi for setting of the filter coefficient $a_j$. The gradient coefficients are designated with $g_j$ for the recursive part. The switch $S_2$ is contained in FIG. 2, which switch has already been described in connection with FIG. 1.

In contrast to the known equalizer construction there is provided a switch S1 between the decision device D and a chain of delay members Vz in the recursive part of the filter Fi. The switch as shown switches the connection of the feedback input into the recursive part of the filter between a reference signal source and a decision device. However, if the filter is used as a multiplexed path and only one filter is employed then by way of switch S1 or otherwise it is to be provided for respective changes in the connections of the other inputs and outputs of the filter to provide correspondence with the circuits shown in FIGS. 2 and 3, respectively. If the switch S1 is in the switching position 1, then the equalization error $e_n$ is determined according to the following equation under the assumption $$\hat{y}_n \cong r_n \quad (8)$$

$$e_n = \sum_{k=0}^{N} b_k \cdot x_{n-k} - \sum_{k=1}^{M} a_k \cdot r_{n-k} - r_n \quad (9)$$

According to equation (3) the following approximation equation is obtained under consideration of equation (9):

$$I \cong K' \cdot Q \cdot K - 2 \cdot K' \cdot V + C$$

In this context K' designates the transposed coefficient vector, I is the mean squared error, Q is a symmetrical matrix, V is a vector with components of submatrices of Q and C is a constant: where $$Q = \begin{pmatrix} A & C \\ C & B \end{pmatrix} \quad (11)$$

is a symmetric matrix with the submatrices $$A = (\alpha_{ij}) \; i = 1, \ldots, M; \; j = 1, \ldots, M \quad (12a)$$

$$B = (\alpha_{ij}) \; i = 0, \ldots, N; \; j = 0, \ldots, N \quad (12b)$$

$$C = (-\gamma_{ij}) \; i = 1, \ldots, M; \; j = 0, \ldots, N \quad (12c)$$

and V is a vector $$V = (-\alpha_{o1} - \alpha_{o2} \ldots -\alpha_{oM} | \gamma_{oo} \gamma_{o1} \ldots \gamma_{oN})' \quad (13)$$

The elements $\alpha_{ij}, \beta_{ij}, \gamma_{ij}$ are given by $$\alpha_{ij} = E\{r_{n-i} r_{n-j}\} \; i = 0, 1, \ldots, M; \; j = 0, 1, \ldots, M \quad (14a)$$

$$\beta_{ij} = E\{x_{n-i} x_{n-j}\} \; i = 0, 1, \ldots, N; \; j = 0, 1, \ldots, N \quad (14b)$$

$$\gamma_{ij} = E\{r_{n-i} x_{n-j}\} \quad i=0,1,\ldots,M; \; j=0,1,\ldots,N \qquad (14c)$$

The mean squared error I is a function of the coefficient vector K, which in turn is a function of the variable step size factor $\alpha$. The error $I_i = I(K(i))$ is a function of $\alpha(i-1)$. $I_i$ is minimized in the direction of $-(\nabla I)_{i-1}$ and setting the derivation of $I_i$ with respect to $\alpha(i-1)$ equal to zero, the optimum step size is obtained:

$$\alpha(i-1) = \frac{\frac{1}{2}(\nabla' I)_{i-1} \frac{1}{2}(\nabla I)_{i-1}}{\frac{1}{2}(\nabla' I)_{i-1} Q \frac{1}{2}(\nabla I)_{i-1}} \qquad (15)$$

$\alpha(i-1)$ has to be determined in each iteration step in real time. It can be shown that the denominator of equation (15) can be substituted by the denominator of the following equation (16) and the variable step factor $(i-1)$ can be calculated by employing the same structure for the filter Fi. For this purpose, the filter coefficient $b_k$ and respectively $a_j$ are to be substituted by the gradient coefficient $g_k$ and respectively $g_j$ and the switch $S_1$ is to be put in the switch position 2. The following equation (7) holds for the variable step size factor:

$$\alpha(i-1) = \frac{\frac{1}{2} \cdot |\nabla I|^2_{i-1}}{E\{w_n^2\}_{i-1}} \qquad (16)$$

A corresponding switching circuit is shown in FIG. 3, where the end result $\alpha(i-1)$ is stored in Sp$\alpha$.

The reference signal $r_n$, the scanned, noisy data signal $x_n$ and the gradient coefficients $\tilde{g}_k$ or respectively $g_j$ are read from the corresponding storage provisions Spr, Spx, Sp$\tilde{g}$, and Spg. The nominator of the expression for the variable step size factor is determined according to equation (16) by squaring in each case the stored gradient coefficients $g_j$ and $\tilde{g}_k$ in the means for squaring and by forming from these squared coefficients the sum in SGr.

The inverse denominator of the step size factor $\alpha$ is determined according to equation (16) by squaring the filter output signal in a means for squaring Mw$_n$, by summing over a number of clock cycle periods in the means for summing SMw$_n$ and by inverting the sum in the inverter J$_{ane}$. As is shown in FIG. 3, a switch S4 is closed after the summing of the squared filter output signal $w_n$. Thus the same filter circuit can be employed for the operations shown in FIGS. 2 and 3. For easier understanding and for illustration purposes of the transfer of the multiplex structure from FIG. 2, the digital filter Fi in FIG. 3 is surrounded by dashed lines. The thus calculated step size factor $\alpha(i-1)$ is stored and as already explained in the context of FIG. 2 is employed in determining the filter coefficients a, b during the iteration interval with the index $(i-1)$.

Figure 4:
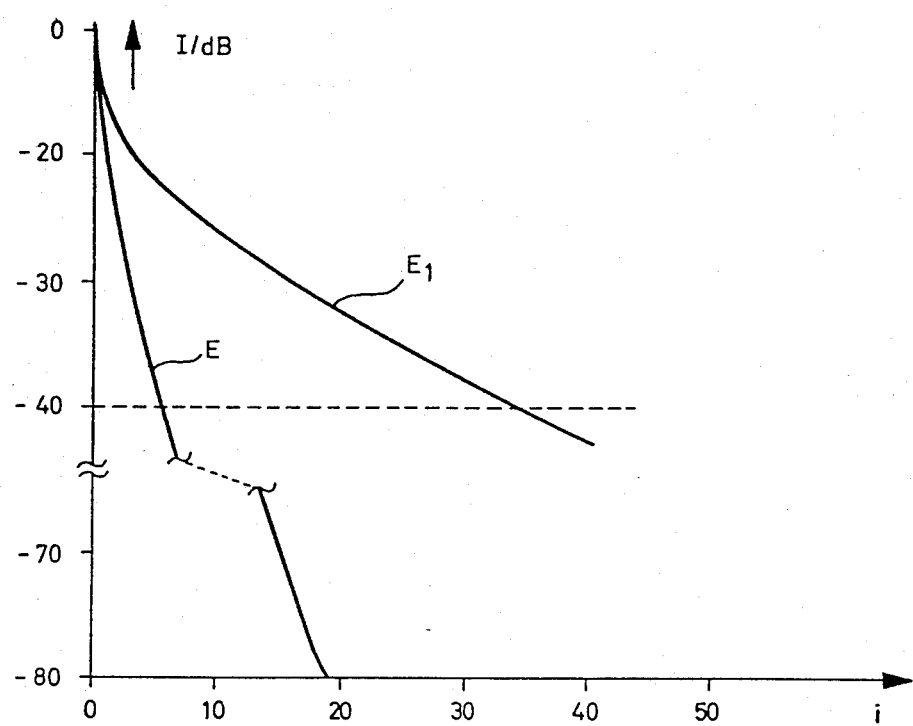
FIG. 4 is a view of a diagram illustrating the course of the curve corresponding to a square equalization error versus the number of the intervals of iteration.

In order to illustrate the influence of a variable step size factor $\alpha$ on the number of iteration intervals i necessary for equalization, FIG. 4 shows the course of the square equalization error I for an automatic and adaptive, decision feedback equalizer $E_1$, where the filter coefficients are determined according to the gradient procedure with a constant step factor and for an equalizer E, where the invention method is employed. The substantial decrease of the number of the iteration intervals before reaching a preset quality of equalization obtained according to the invention method can be easily recognized.

It will be understood that each of the elements described above, or two or more together, may also find a useful application in other types of equalization system configurations and signal filtering procedures differing from the types described above.

While the invention has been illustrated and described as embodied in the context of an automatic and adaptive digital nonlinear decision feedback equalizer, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An automatic and adaptive digital nonlinear decision feedback equalizer comprising
   an input provision for entering signals;
   a digital filter having a recursive part and a non-recursive part and connected to the input provision and generating an auxiliary signal ($w_n$);
   a threshold decision device connected to the output of the digital filter for determining if the value at the input of the threshold decision device is coordinated to a certain signal level region;
   a switch having a first input connected to the output of the threshold decision device and having its output connected to a recursive input of the digital filter; and
   a reference signal source connected to a second alternate input of the switch for inducing in its switched on position in the digital filter a reference signal ($r_n$) for, in conjunction with the auxiliary signal, the determination of a step factor for the recursion process.

2. The automatic and adaptive digital nonlinear decision feedback equalizer according to claim 1 wherein the digital filter comprises setting devices for setting the filter coefficients and/or the filter output signals, and means for deriving variable step factors depending on the digital filter output signals.

3. The automatic and adaptive digital nonlinear decision feedback equalizer according to claim 1 further comprising
   means for determining gradient coefficients ($g_j, \tilde{g}_k$) according to the output of the digital filter;
   means for squaring the gradient coefficients connected to the means for determining the gradient coefficients;
   adding device for summing the squared gradient coefficients;
   second means for squaring the digital filter output signals connected to the digital filter output;
   means for summing the squared filter output signals connected to the second means for squaring;
   inverting means connectable to the adding device for inverting the sum of the squared filter output signal; and
   multiplier means connected to the inverting means and to the means for summing.

4. The automatic and adaptive digital nonlinear decision feedback equalizer according to claim 3 further comprising
a second switch (S$_4$) interposed between the output of the adding device and the input of the inverting means, and a storage for step factors connected to the multiplier means.

5. The automatic and adaptive digital nonlinear decision feedback equalizer according to claim 1 further comprising
a memory connectable to an input of the filter for storing an input signal as desired.

6. The automatic and adaptive digital nonlinear decision feedback equalizer according to claim 1 further comprising
an adding member connected to the output of the digital filter and to a reference signal source for providing an equalizing error signal.

7. The automatic and adaptive digital nonlinear decision feedback equalizer according to claim 6 further comprising
a multiplier connected to the adding member and to the filter for multiplying the equalizing error signal with a delayed input signal;
a second adding member connected to the output of the multiplier over certain time intervals;
a further switch (S$_{3y}$) connected to the output of the second adding member; and
a storage connected to the further switch for storing gradient coefficients.

8. The automatic and adaptive digital nonlinear decision feedback equalizer according to claim 7 further comprising
a storage for step factors;
a second multiplier connected to the further switch and to the storage for step factors;
a third adding member connected to the output of the second multiplier and to the digital filter; and
a delay device connected to the output of the third adding member and its output being connected to the digital filter.

9. The automatic and adaptive digital nonlinear decision feedback equalizer according to claim 7 further comprising
a switched connection between the storage and the digital filter.

10. The automatic and adaptive digital nonlinear decision feedback equalizer according to claim 7 further comprising
a further multiplier connected to the adding member and to the filter for multiplying the equalizing error signal with a delayed recursive input signal;
a further adding member connected to the output of the further multiplier over certain time intervals;
an additional switch (S$_3$R) connected to the output of the further adding member;
a second storage connected to the additional switch for storing the gradient coefficients;
a storage for step factors;
an additional mulitplier connected to the additional switch and to the storage for step factors;
an additional adding member connected to the output of the additional multiplier and to the digital filter; and
a further delay device connected to the output of the additional adding member and having its output :; connected to the digital filter.

11. The automatic and adaptive digital nonlinear decision feedback equalizer according to claim 1 further comprising
a storage;
means for determining gradient coefficients (g$_j$,$\tilde{g}_k$) according to the gradient procedure connected to the output of the digital filter and to the input of the storage for providing gradient coefficients to the storage.

12. The automatic and adaptive digital nonlinear decision feedback equalizer according to claim 1 wherein the digital filter comprises
two series of delay members each connected in series;
a plurality of setting devices connected to the respective outputs of the delay members or to a signal input; and
a filter output storage connected to the setting devices.

13. The automatic and adaptive digital nonlinear decision feedback equalizer according to claim 12 wherein multipliers are connected to a storage for gradient coefficients.

14. The automatic and adaptive nonlinear decision device feedback equalizer according to claim 13 further comprising
an adding member for providing filter coefficients (bk);
a further adding member for providing filter coefficients (aj);
a delay device connected to the adding member;
a second delay device connected to the further adding member;
and wherein the setting members are further connected to the delay device or to the second delay device.

15. A method for equalizing an incoming noisy signal employing an automatic and adaptive decision feedback equalizer comprising
feeding back the output signal from an in part non-recursive and in part recursive digital filter;
feeding the output signal of the filter to a threshold decision device for determining if the value at the input of the threshold decision device is coordinated to a certain signal level region;
providing a reference signal from a reference signal source; connecting a first input terminal of a switch to the output of the threshold decision device, where the output terminal of the switch is connected to the filter, for allowing the filter to generate an equalizer output;
connecting a first input terminal of a switch to the output of the decision device, where the output terminal of the switch is connected to the filter, for allowing the filter to generate an equalizer output;
connecting a second input terminal of the switch to the reference signal source for allowing the filter to generate a filter output signal; and
employing the filter output signal to determine the step factor for the filter.

16. The method for equalizing an incoming noisy signal according to claim 15 further comprising deriving the step factor from the filter by evaluating the mean squared error between a reference signal and a filter output signal.

17. The method for equalizing an incoming noisy signal according to claim 15 further comprising minimizing the criterion according to a gradient procedure.

18. The method for equalizing an incoming noisy signal according to claim 15 wherein a feedback loop of the filter comprises a recursive part and a nonrecursive part with respective filter coefficients ($a_j, b_k$) and wherein the switch is provided between the decision device and a device ($Ma_j$, $Mb_k$) for setting the filter coefficients ($a_j, b_k$); further comprising determining the gradient coefficients ($g_j, \widetilde{g}_k$) according to the gradient procedure at the starting of an iteration interval;

storing in a memory the gradient coefficients ($g_j, \widetilde{g}_k$);

switching the switch into a second position;

feeding the stored gradient coefficients ($g_j, \widetilde{g}_k$) to the device ($Ma_j, Mb_k$) for providing the filter output signal ($w_n$);

producing the variable step factor from the filter output signal ($w_n$) and from the stored gradient coefficients ($g_j, \widetilde{g}_k$);

storing the variable step factor in a memory; and determining the optimal setting of each filter coefficient ($a_j, b_k$) during an iteration interval from the variable step factor and from the stored gradient coefficients ($g_j, \widetilde{g}_k$).

19. The method for equalizing an incoming noisy signal according to claim 18 further comprising squaring the stored gradient coefficients ($g_j, \widetilde{g}_k$) in each case;

summing the squared gradient coefficients;

squaring the filter output signal ($w_n$);

summing the squared filter output signals;

inverting the sum of the squared output signals;

multiplying the inverse of the sum of the squared filter output signals with the sum of the squared gradient coefficients for obtaining the variable step factor.

20. The method for equalizing an incoming noisy signal according to claim 19 further comprising summing the filter output signal over a specified number of cycles; and reading the resulting sum via a switch.

21. The method for equalizing an incoming noisy signal according to claim 18 further comprising summing the gradient coefficients ($g_j, \widetilde{g}_k$) according to their absolute values;

summing the filter output signals ($w_n$) according to their absolute values:

inverting the sum of the absolute values of the absolute values of the filter output signals; and multiplying the inverse of the sum of the absolute values of the filter output signals with the sum of the absolute values of the gradient coefficients for obtaining a step factor.

22. A system for equalizing an incoming noisy digital signal for an automatic and adaptive decision feedback equalizer where a correction criterion is derived from a reference signal and from a filter output signal and where the correction criterion is minimized by way of iteration according to a gradient procedure, wherein the equalizer comprises a recursive and a nonrecursive part, where a switch is disposed in a feedback loop between a threshold decision device (D) for determining if the value at the input of the threshold decision device is coordinated to a certain signal level region and the recursive part, where in a first position (1) of the switch (S1) an equalizer output signal ($y^n$) and where in a second position (2) of the switch (S1) a reference signal ($r_n$) is fed to the feedback branch of the filter and where the reference signal ($r_n$) is employed together with the filter output signal ($w_n$) for the determination of the step factor for the recursion process.

23. The system for equalizing an incoming noisy digital signal according to claim 22 wherein the switch (S1) is provided in the feedback loop of a filter (Fi) with a nonrecursive part and with a recursive part with respective filter coefficients ($a_j, b_k$) between the decision device (D) and a device ($Ma_j, Mb_k$) for setting of the filter coefficients ($a_j, b_k$), where at the start of the iteration interval (i) the gradient coefficients ($g_j, \widetilde{g}_k$) are calculated according to the gradient procedure and stored for the time interval during which the switch (S1) is positioned in the position (1);

where thereafter the switch (S1) is brought into the second position (2) and the stored gradient coefficients ($g_j, \widetilde{g}_k$) are fed to the device ($Ma_j, Mb_k$) for determining the filter output signal ($w_n$);

where the variable step factor ($\alpha$) is derived from the filter output signal ($w_n$) and from the stored gradient coefficients ($g_j, \widetilde{g}_k$) and where the optimal setting for each filter coefficient ($a_j, b_k$) is determined during an iteration interval (i) with the variable step factor ($\alpha$) and the stored gradient coefficients ($g_j, \widetilde{g}_k$).

24. The system for equalizing an incoming noisy digital signal according to claim 23 wherein the stored gradient coefficients ($g_j, \widetilde{g}_k$) are squared in each case in a means for squaring;

where from the squared gradient coeffients a sum is formed, where the filter output signal ($w_n$) is squared, summed and the resulting sum is inverted and where the inverse ($\alpha_{ne}$) of the squared and summed filter signals ($w_n$) is multiplied with the sum ($\alpha_z$) of the squared gradient coefficients for determination of the variable step factor ($\alpha$).

25. The system for equalizing an incoming noisy digital signal according to claim 24 where the filter output signal ($w_n$) is summed up over a number of clock cycle periods and where the sum can be read via a switch ($S_4$).

26. The system for equalizing an incoming noisy digital signal according to claim 23 wherein stored gradient coefficients ($g_j, \widetilde{g}_k$) are added according to their absolute value, where the filter output signal ($w_n$) is added according to its absolute value and where the resulting sum is inverted and where the inverse of the sum of the absolute values of the filter output signals ($w_n$) is multiplied with the sum of the absolute values of the gradient coefficients for obtaining a step factor ($\alpha$).

27. The system for equalizing an incoming noisy digital signal according to claim 22 wherein the mean squared error is derived between a reference signal and a filter output signal as a basis for the correction procedure.

* * * * *